United States Patent
Allison et al.

(10) Patent No.: US 7,552,276 B2
(45) Date of Patent: *Jun. 23, 2009

(54) SYSTEM, METHOD AND PROGRAM FOR MANAGING STORAGE

(75) Inventors: Brett M. Allison, Fort Worth, TX (US); Elise Bobitt, Lewisville, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/038,488

(22) Filed: Feb. 27, 2008

(65) Prior Publication Data

US 2008/0147972 A1 Jun. 19, 2008

Related U.S. Application Data

(63) Continuation of application No. 11/260,637, filed on Oct. 26, 2005, now Pat. No. 7,356,643.

(51) Int. Cl.
G06F 12/00 (2006.01)
(52) U.S. Cl. .......................................... 711/113; 714/42
(58) Field of Classification Search ................. 711/113; 714/42
See application file for complete search history.

(56) References Cited

U.S. PATENT DOCUMENTS 6,742,034 B1 5/2004 Schubert et al.

(Continued)

FOREIGN PATENT DOCUMENTS

JP 20020182859 A2 6/2002

OTHER PUBLICATIONS

Daniel Demer et al., "TotalStorage Expert Reporting: How to Produce Built-In and Customized Reports," dated Oct. 2003.

(Continued)

*Primary Examiner*—Kevin L Ellis
*Assistant Examiner*—Hashem Farrokh
(74) *Attorney, Agent, or Firm*—Arthur J. Samodovitz (57) ABSTRACT

System, method and program for managing a storage server comprising first and second clusters of storage controllers. The first cluster comprises one or more storage controllers each controlling one or more storage arrays. The first cluster also comprises a first cache memory and a first nonvolatile storage ("NVS") shared by the one or more storage controllers of the first cluster. The second cluster comprises one or more storage controllers each controlling one or more storage arrays. The second cluster also comprises a second cache memory and a second nonvolatile storage shared by the one or more storage controllers of the second cluster. There is monitoring of an amount of time that data controlled by each of the clusters is held in the cache memory of the cluster before being outpaged to the storage arrays. There is monitoring of an amount of requests to access storage arrays of a cluster that were delayed due to insufficient NVS. A level of impairment of access to each of the storage arrays is determined based on the amount of time that data controlled by each of the clusters was held in the cache memory of the cluster before being outpaged to the storage arrays, and the amount of requests to access the storage arrays of a cluster that were delayed due to insufficient NVS. When access to a storage array is excessively impaired, data is moved from the access-impaired storage array to another storage array with a lower level of access impairment.

18 Claims, 3 Drawing Sheets

U.S. PATENT DOCUMENTS

| | | |
|---|---|---|
| 6,829,610 B1 * | 12/2004 | Hickman et al. ............... 707/10 |
| 2002/0103969 A1 | 8/2002 | Koizumi et al. |
| 2004/0148485 A1 * | 7/2004 | Suzuki ....................... 711/170 |
| 2004/0168170 A1 | 8/2004 | Miller |
| 2005/0108292 A1 | 5/2005 | Burton et al. |
| 2005/0129016 A1 | 6/2005 | Taninaka et al. |
| 2005/0149940 A1 | 7/2005 | Calinescu et al. |
| 2005/0193168 A1 * | 9/2005 | Eguchi et al. ............... 711/114 |

OTHER PUBLICATIONS

Mary Lovelace et al., "IBM TotalStorage Expert Hands-On Usage Guide", dated Jan. 2003.

Mary Lovelace et al., "Managing Disk Subsystems Using IBM TotalStorage Productivity," dated Sep. 2005.

* cited by examiner

FIG. 3

SYSTEM, METHOD AND PROGRAM FOR MANAGING STORAGE

CROSS REFERENCE TO RELATED APPLICATION

This is application is a Continuation application of U.S. patent application No. 11/260,637 filed Oct. 26, 2005, and now U.S. Pat. No. 7,356,643

FIELD OF THE INVENTION

The present invention relates generally to computer systems, and more specifically to load balancing of storage arrays or devices.

BACKGROUND OF THE INVENTION

Storage devices such as disks are well known. It was also well known that storage controllers control access to the storage devices in response to read and write requests. The storage controllers also mirror data to different storage devices and spread data amongst different storage devices for redundancy and backup purposes. Storage controllers were also known to store data in accordance with one of several known RAID security levels. Generally, the higher the RAID level the greater the redundancy of the data storage.

It was also known that pooled storage devices can be used to increase storage capacity and provide recovery and backup services.

Storage servers, such as an IBM Enterprise Storage Server, were also known. An IBM ESS storage server includes two clusters of processors and associated hardware. Typically, there are four storage controllers in each cluster. Each of the storage controllers controls multiple storage devices grouped in RAID arrays. In one environment, clients with Fiber Channel Host Bus Adapters ("HBAs") are coupled via a Fiber Channel to a switch. The switch is also coupled to the Storage Server with Fiber Channel HBAs. There may be multiple storage servers per client. Each client is assigned or allocated storage "volumes" which are mapped to physical locations on storage devices that are grouped in RAID arrays. Consequently, clients make data access requests (reads and writes) to the storage server, for data within their allocated volumes, and the storage server accesses the mapped locations in cache storage to satisfy the requests or from disk if the data does not reside in cache storage.

A known IBM Enterprise Storage Server comprises two clusters of storage controllers with four storage controllers per cluster. Each cluster has its own cache (semiconductor) memory shared by all storage controllers in the cluster. Each cluster also has battery backed up nonvolatile storage ("NVS") which is shared by all of the storage controllers in the cluster, although any one storage controller cannot use more than 25 percent of the total NVS allocated to the cluster. In addition, each storage controller has its own cache (disk) storage. The cache memory is used for rapid access to data inpaged from external storage to service read data access requests from memory and to provide buffering of modified data. All update requests are written to the associated cluster and backed up by the NVS on the mirrored cluster.

Occasionally, one or more of the storage controllers or arrays become "over-utilized", i.e. there are more data access requests than can be handled expeditiously. The problem may be due to I/O delays within the storage server or other hardware or bandwidth constraints. It was known to move some of the data from a disk of an over-utilized or over-accessed array to another, lesser-utilized array. It was also known that when a cache memory is too small, there may be excessive outpaging of the data in the cache memory to storage, to make room for inpaging of data for which access is requested. It was known to increase the size of the cache memory, when found to be too small, to the capacity of the hardware.

A known IBM TotalStorage Expert program tool monitored cache memory, NVS, Physical Array Activity and Logical Volume activity in a known IBM Enterprise Storage Server. The TotalStorage Expert program tool is further described in published documents, "IBM TotalStorage Expert Reporting: How to Produce Built-In and Customized Reports" by Daniel Demer et al., dated October 2003, and "IBM TotalStorage Expert Hands-On Usage Guide" by Mary Lovelace et al., dated January 2003.

A known Tivoli Multiple Device Manager program tool monitored cache memory, NVS, Physical Array Activity and Logical Volume Activity in a known IBM Enterprise Storage Server, and reported performance data and exceptions. The Tivoli Multiple Device Manager program tool is further described in a published document, "Managing Disk Subsystems using IBM TotalStorage Productivity" by Mary Lovelace et al., dated September 2005.

An object of the present invention is to accurately determine the effectiveness of a storage system to access a storage device.

Another object of the present invention is to take corrective action when the effectiveness of the storage system is impaired.

SUMMARY OF THE INVENTION

The present invention resides in a system, method and program for managing a storage server comprising first and second clusters of storage controllers. The first cluster comprises one or more storage controllers each controlling one or more storage arrays. The first cluster also comprises a first cache memory and a first nonvolatile storage ("NVS") shared by the one or more storage controllers of the first cluster. The second cluster comprises one or more storage controllers each controlling one or more storage arrays. The second cluster also comprises a second cache memory and a second nonvolatile storage shared by the one or more storage controllers of the second cluster. There is monitoring of an amount of time that data controlled by each of the clusters is held in the cache memory of the cluster before being outpaged to the storage arrays. There is monitoring of an amount of requests to access storage arrays of a cluster that were delayed due to insufficient NVS. A level of impairment of access to each of the storage arrays is determined based on the amount of time that data controlled by each of the clusters was held in the cache memory of the cluster before being outpaged to the storage arrays, and the amount of requests to access the storage arrays of a cluster that were delayed due to insufficient NVS. When access to a storage array is excessively impaired, data is moved from the access-impaired storage array to another storage array with a lower level of access impairment.

According to a feature of the present invention, a level of impairment of access to a first one of the storage arrays is determined based on an amount of time required to satisfy substantially all subsystem I/O requests to the first storage array, and an amount of subsystem I/O requests to the first storage array.

According to another feature of the present invention, there is a determination that an excessive amount of time is required for a first cluster to access a first storage array. In response, a determination is made that data from the first storage array should be moved to another storage array with a lower level of access impairment.

DETAILED DESCRIPTION OF THE PREFERRED EMBODIMENTS

Figure 1:
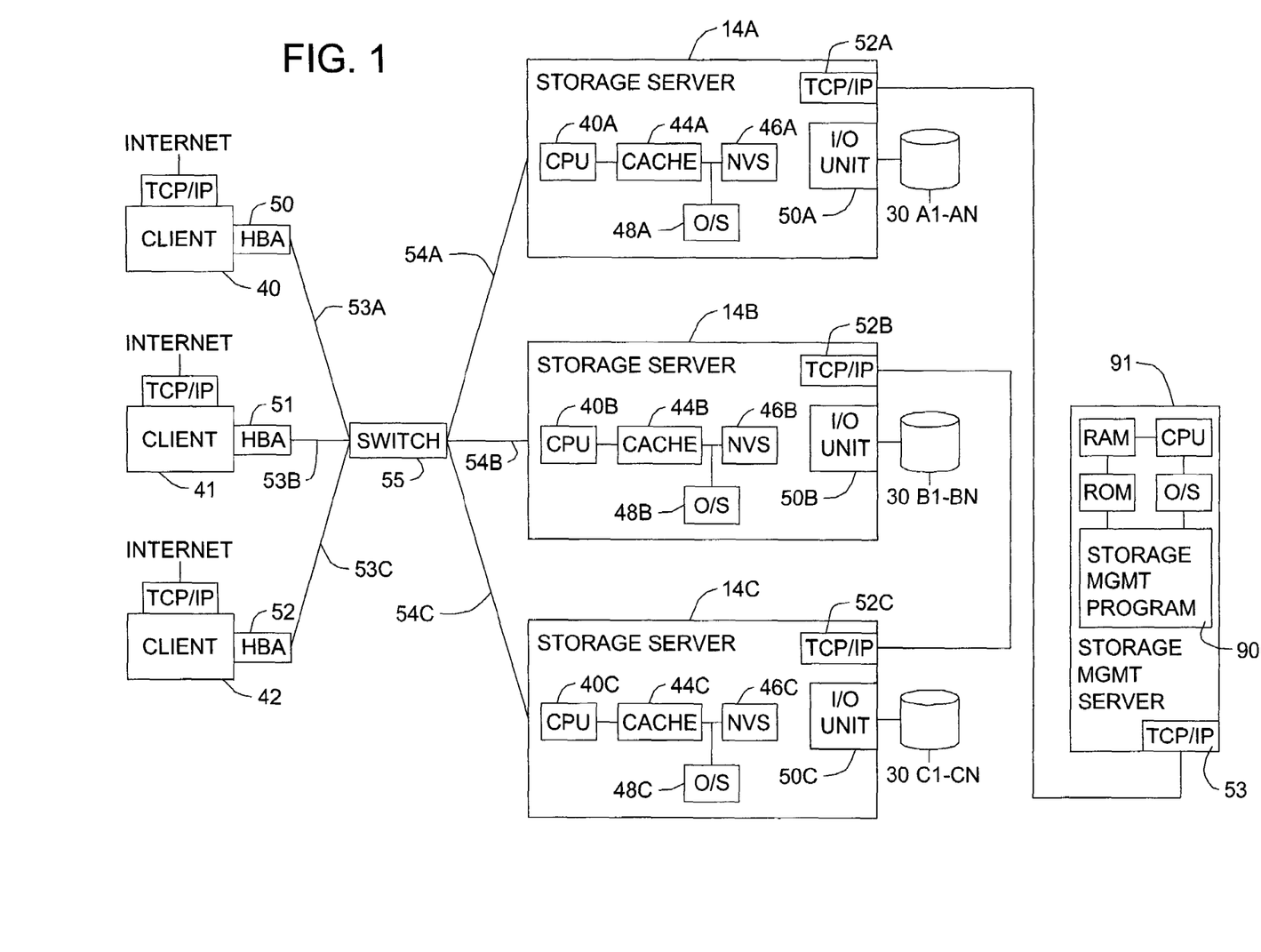
FIG. 1 is a block diagram of a distributed computer system including storage servers and a storage management server, in which the present invention is incorporated.

The present invention will now be described in detail with reference to the figures. FIG. 1 illustrates a distributed computer system generally designated 10 which includes the present invention. System 10 comprises multiple, similar storage servers 14a,b,c with respective CPU 40a,b,c, CACHE 44a,b,c, nonvolatile storage ("NVS") 46a,b,c, operating system 48a,b,c, I/O unit 50a,b,c, and TCP/IP adapter card 52a,b,c, according to the Prior Art. Each of the storage servers 14a,b,c manages storage allocation and access to multiple storage devices (such as disks) 30al-an, 30bl-bn, and 30cl-cn, respectively, by clients 40, 41 and 42. Clients 40, 41 and 42 have adapter cards 50, 51 and 52, such as a Fibre Channel adapter cards, for connection via a communication path 53, such as a Fibre Channel, to a switch 55. Switch 55 can be coupled to storage servers 14a,b,c via host bus adapters (HBAs) 49a,b,c, and can forward a request from any of the clients 40, 41 or 42 to any of the storage servers 14,a,b,c as configured on the client. An administrator has allocated to each of the clients 40, 41 and 42 a number of storage "volumes". Each "volume" resides on a storage array. A "storage array" can comprise one or more storage devices and be configured in a variety of RAID levels such as RAID5, RAID10 or Just a Bunch of Disks (commonly referred to as JBOD).

Figure 2:
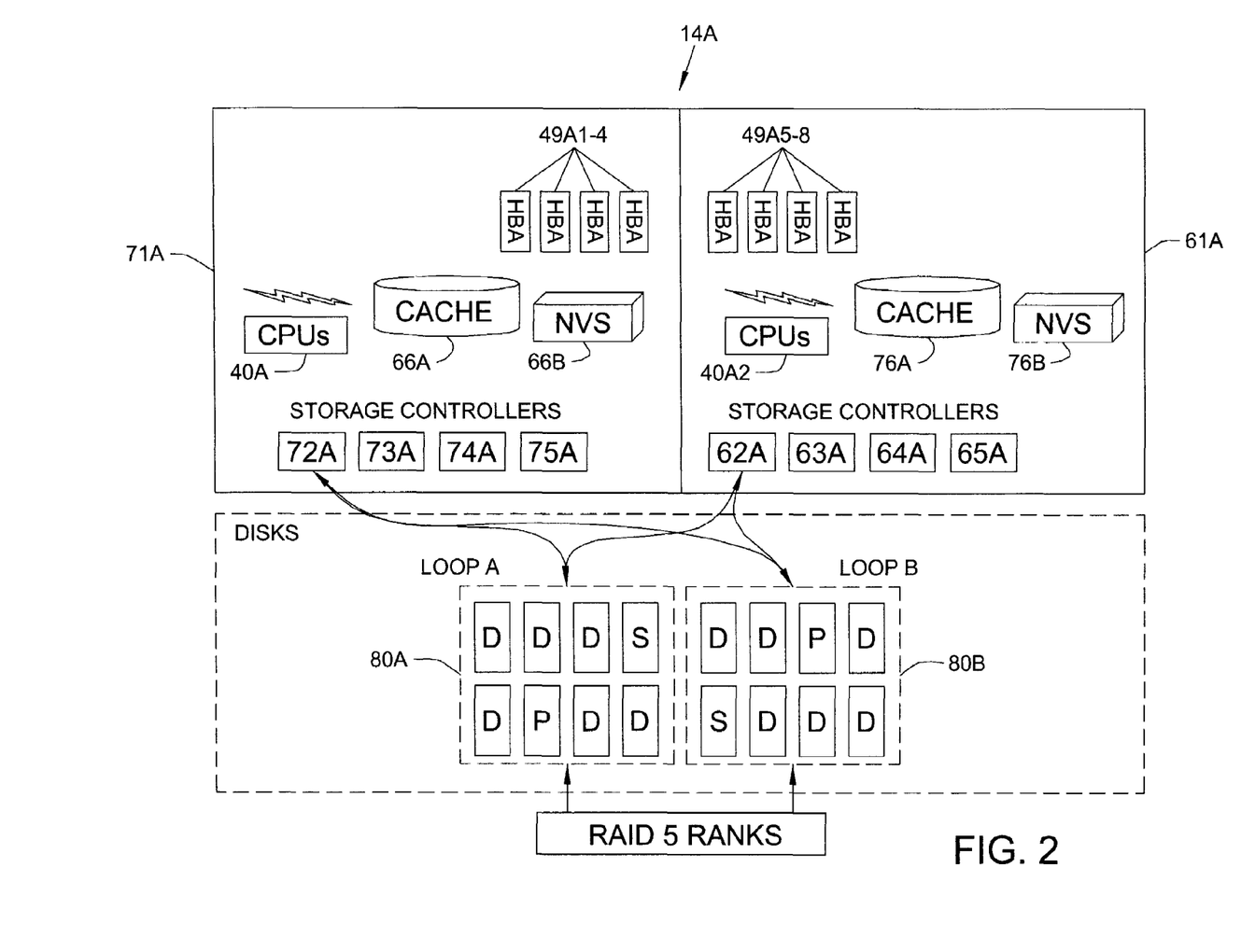
FIG. 2 is a block diagram of one of the storage servers of FIG. 1, in accordance with the Prior Art.

In the embodiment illustrated in FIG. 2, storage server 14a (and likewise storage servers 14b and c) includes two identical clusters 61a and 71a of CPUs, Cache, NVS, and storage controllers, with four storage respective controllers 62a-65a and 72a-75a per cluster. There is a shared cache (semiconductor) memory 66a and 76a for each cluster 61a and 71a, respectively. Each cluster also contains battery backed-up storage 67a and 77a (also called "NVS"). In FIG. 2, "D" represents a data disk, "P" represents a parity disk for storing parity bits for the data in the data disks, and "S" represents a spare disk in the event of failure of a data disk or parity disk. Each cluster maintains a mapping of the storage allocation to each client that correlates each storage volume to corresponding physical locations on the storage arrays. When the client requests access to storage, i.e. to read from or write to data in one of the volumes allocated to the client, then the storage cluster that manages that volume will process the request, i.e. temporarily store client updates into the cache memory and NVS on the paired cluster. For update requests, an I/O completion notification is sent to the client upon NVS store. Upon reaching an internal threshold for pending writes, the cluster will map the client request to the physical locations, and then forward the mapped request from the cache storage to the appropriate storage array. For read requests, data is either satisfied from cache memory or requires disk access (because of a "cache miss"). Cache misses for read requests require the cluster to map the client request to the physical locations on the storage array and transfer the data from the physical location on the arrays to the cache memory where it satisfies the client I/O request.

Referring again to FIG. 1, system 10 also includes a storage management program 90 in a storage management server 91, according to the present invention to monitor ease (or difficulty) of access to storage arrays and associated bandwidth constraints. Program 90 also recommends a corrective action when a storage controller is too slow in accessing storage. This may be due to over utilization of the storage controller or array, a deficiency in cache memory of the cluster that includes the storage controller and array or a deficiency in the NVS for the cluster associated with the storage controller and its arrays. The measurement is based on multiple utilization metrics. In the illustrated embodiment, computer 91 is coupled to storage servers 14a,b,c via a SAN network. Alternately, there can be a separate instance of program 90 executing on each storage server 14a,b,c and communicating with the other instances of program 90 on the other storage servers via a TCP/IP network.)

When the performance of a storage controller in accessing its storage is impaired beyond a predetermined threshold level, then program 90 may recommend relocating some data from a storage array of the storage controller to another storage array of another storage controller, in the same or different cluster, as follows. (A "storage array" comprises one or more storage devices such as one or more storage disks.) If the main impairment is due to insufficiency of cache memory, then program 90 will recommend relocating some of the data from the original storage array of the original cluster to another storage array of another storage controller in another cluster in the same or different storage server, where the other storage controller has lesser impairment level. If the main impairment is due to insufficiency of NVS, then program 90 will recommend relocating some of the data from the original storage array of the original storage controller to another storage array of another storage controller in another cluster in the same or different storage server, where the other storage controller has lesser impairment level. If the main impairment is due to insufficient I/O bandwidth of the physical devices comprising an array, then program 90 will recommend relocating some of the data from the original storage array of the original storage controller to another storage array of another storage controller of a different storage server, where the other storage controller or array has lesser access impairment level. Consequently, there will likely be fewer subsequent storage access requests for the data within the original storage array of the original storage controller for which access was impaired, and more subsequent storage access requests for the data within the other storage array of the other storage controller for which access is not impaired.

Figure 3:
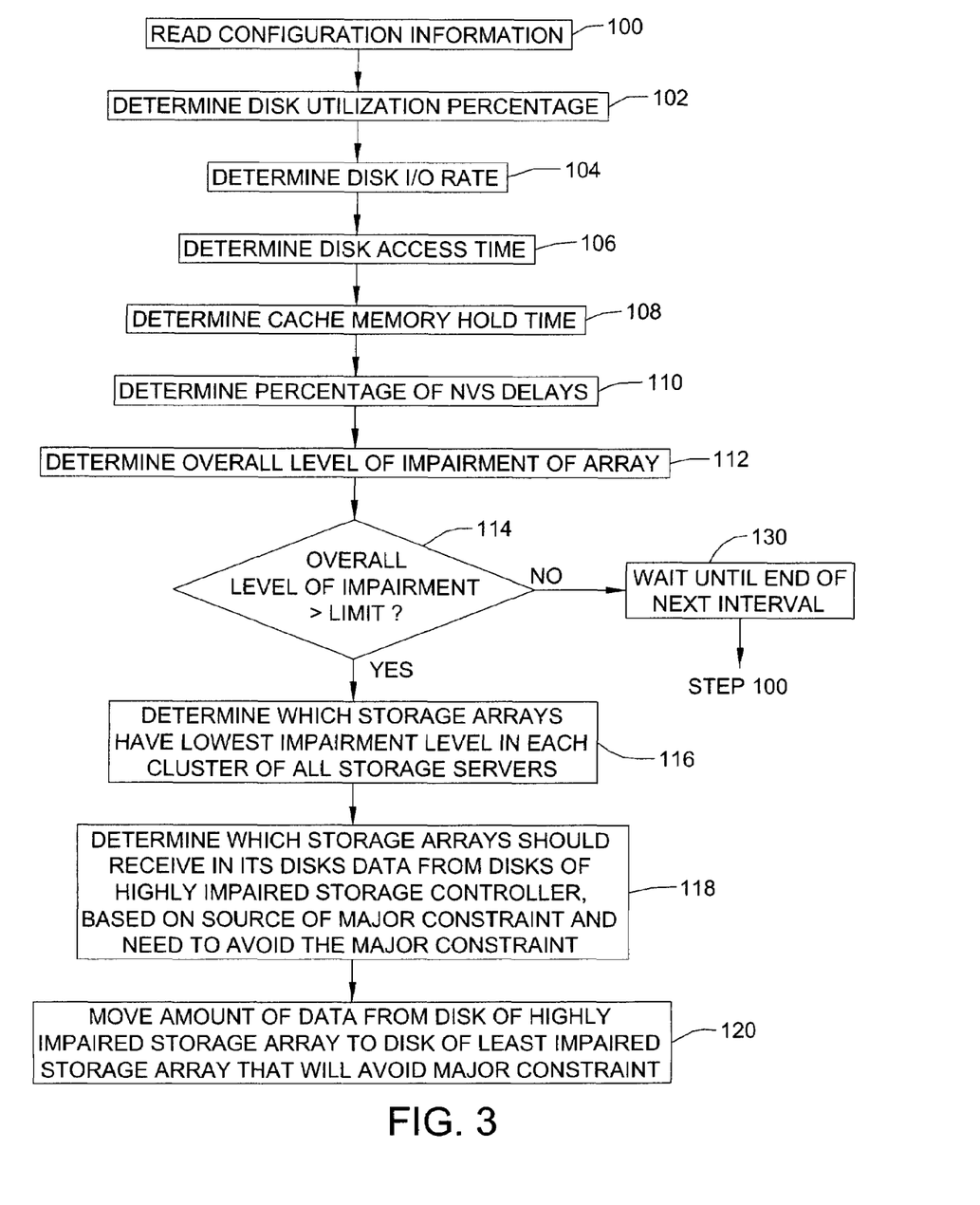
FIG. 3 is a flow chart of a storage management program within the storage management server of FIG. 1, in accordance with the present invention.

FIG. 3 illustrates operation of program 90 in more detail. In step 100, program 90 reads configuration information for each of the storage clusters, storage controllers and storage arrays in storage servers 14a,b,c. As described below, the configuration information indicates the model number of the storage server, the size of each cluster's cache storage, the size of the NVS in each storage cluster, the size of the external storage (typically disk) controlled by each storage server, and the RPMs of the disks. Next, program 90 measures or obtains measurement of the following metrics. Program 90 obtains a current disk utilization rate for each storage controller (step 102). Program 90 obtains a current disk I/O rate for each storage array (step 104). Program 90 obtains a current disk access time for each storage array (step 106). Program 90 obtains a current cache memory hold time for each storage cluster associated with the array. All storage controllers in the same cluster use the same cache memory and NVS. Program 90 obtains a current level of NVS unavailability (step 110).

The following is more detailed information about the foregoing metrics, and how program 90 makes or obtains the measurements of these metrics for each storage array:

Average disk utilization rate, i.e. percent utilization time of storage devices controlled by the storage controller. In part, this is a function of bandwidth. In other words, this metric is the percent of time that I/O operations are occurring and consuming the effective bandwidth of the storage controller to storage devices on an array. Program 90 determines disk utilization by querying the IBM TotalStorage Expert program tool which derives the utilization. By way of example, program 90 can query a known IBM TotalStorage Expert program tool to monitor disk utilization rates of an array on its associated storage controller provided by a known IBM Enterprise storage Server. The TotalStorage Expert program tool generates a known VPCRK table which records the average disk utilization for all storage devices on a given storage array in a field labeled Q_SAMP_DEV_UTIL.

Average I/O rates to disks, i.e. the frequency at which read and write requests are made from a storage controller (via I/O unit 50) to the storage device(s) it controls. This is another bandwidth metric. This metric is the number of physical I/O requests issued to disk drives per second. Program 90 determines I/O rates by querying the BM TotalStorage Expert program tool which subsequently derives the rate from the Enterprise Storage Server. The Enterprise Storage Server captures a count of the physical I/O requests made from the controller to the array during a given interval. The rate is a calculated by dividing the number of I/O requests issued by a storage controller to a storage array during an interval by the number of seconds in the interval. By way of example, program 90 can query a known IBM TotalStorage Expert program tool to monitor disk utilization rates in a storage controller provided by a known IBM Enterprise Storage Server. The Total Storage Expert program tool generates a known VPCRK table which records the I/O rates in a field labeled PC_IOR_AVG.

Average Response Time in Milliseconds—required for each storage controller to access the storage device(s) it controls. Program 90 determines the access time by measuring the time from when the storage controller makes the storage access request to the storage device until the storage device performs the responsive data access operation and returns an acknowledgment that the operation was completed. This is in part, another bandwidth metric. Program 90 determines the time required for each storage controller to access a storage device.

Average cache hold time is a measurement of the amount of time in seconds that data resides in the cache memory of each storage cluster, i.e. on average how long a data segment is kept in the cache memory until it is outpaged or flushed to storage. When the cache memory is too small, there is frequent outpaging to (and inpaging from) external storage, and a low cache hold time. Frequent outpaging to and inpaging from external storage takes time, delays access to the cache memory, and may impair access to external storage because the cache memory is the "bridge" to external storage. Program 90 determines cache hold time by querying the IBM TotalStorage Expert program tool. The Total Storage Expert program tool generates a known VPCRK table which records the average cache hold time in a record labeled Q_CL_AVG_HOLD_TIME.

NVS Delays is a cluster-level percent of total I/O requests delayed due to NVS space constraints in this time period, for the cluster with affinity to this array. When the NVS is too small, the NVS is frequently unavailable to accommodate the storage requests issued to volumes on the paired cluster. Subsequently, the client data will not be written to external storage until the client data is first written to the cache memory of its associated cluster and to the NVS of the paired cluster. The Total Storage Expert program tool generates a known VPCRK table which records the average percent of NVS delays in a record labeled Q_CL_NVS_FULL_PRCT.

Each of the foregoing "current" values is measured over the current measurement interval, which is the last N seconds or minutes, as specified in a configuration file. On a user configurable basis, interval level data can be retrieved from the IBM TotalStorage Expert tool to program 90. The interval level data is then summarized for a user specified shift. The following new metrics for the specified shift are created for later evaluation and recommendation by program 90:

Average Physical I/O Rate: The average of the average number of physical I/Os issued by a storage controller to an array during all the intervals in a specified shift.

Maximum Physical I/O Rate: The maximum of the average number of physical I/Os issued by a storage controller to an array during all the intervals in a specified shift.

Average Percentage Disk storage Utilization for an array: The average of the average percent of each time that disks associated with an array were busy servicing requests; for example, on average X percent of the time, the disks in an array were busy during all the intervals in a specified shift.

Maximum Percentage Disk storage Utilization by array: The maximum of the Average Percentage Disk storage Utilizations during all the intervals in a specified shift.

Cache Hold Time Average: The average of the average number of seconds that data from each track in the cache memory of the storage controller's storage cluster was held in the cache memory during all the intervals in the specified shift.

Cache Hold Time Minimum: The minimum of the average number of seconds that data from each track in the cache memory of the storage controller's storage cluster was held in cache during all the intervals in the specified shift.

Average Percentage of Delayed NVS Requests: The average of the cluster level average of the percentage of requests delayed during all the intervals in the specified shift.

Maximum Percentage of Delayed NVS Requests: The maximum of the cluster level average of the percentage of requests delayed during all the intervals in the specified shift.

Next, program 90 determines the Overall Level of Impairment of Access by a Storage Server to its Storage Devices=f (disk utilization rate)+g(disk I/O rate)+h(cache memory hold time)+i(cache storage unavailability percentage) wherein "f", "g", "h", and "i" are functions, such as respective weighting factors that reflect the significance of each factor in contributing to overall constraint or impairment on access by the storage server (and its storage controllers) to its storage arrays (step 112). Next, program 90 determines if the overall access impairment level of access to the storage array exceeds a predetermined upper limit (decision 114). If not, then program 90 waits until the end of the next user specified shift (step 130), and then loops back to step 100 to repeat the foregoing process with the performance data for the next shift. However, if the overall level of impairment of access to the array exceeds the predetermined upper limit (decision 114, yes branch), then program 90 reviews the storage-access impairment levels of all other storage arrays in all storage servers (step 116).

Next, program 90 determines what is needed to avoid the storage array access constraint, i.e. whether it needs to move the data to an array of another storage array in a different cluster in a different storage server, or whether it can move the data to an array of another storage controller in a different cluster in the same storage server, or whether it can move the data to an array of any other storage controller in any cluster, even a storage controller in the same cluster as the access-constrained one (step 118). In step 118, program 90 compares each of the metrics separately to respective thresholds, to determine the source of the major access-constraint(s). If the metric exceeds its respective threshold, then program 90 deems the metric to be a "major" access-constraint or impairment, and takes appropriate corrective action in step 120, as follows. If the main impairment is due to insufficiency of NVS, then program 90 will recommend relocating some of the data from the original storage array of the original storage controller to the storage array of another storage controller of another cluster in any storage server 14a,b,c, which has the least overall access impairment level. This is because all the storage controllers in each cluster share the same NVS. If the main access constraint or impairment is due to insufficiency of cache memory, then program 90 will recommend relocating some of the data from the original storage array of the original cluster to another storage array of another cluster in any storage server 14a,b,c with the least overall access impairment level. This is because all the storage controllers in each cluster share the same cache memory. Based on the proper corrective action, subsequent access requests for the data which has been moved will be handled by a different storage controller which will avoid the "bottleneck", i.e. the cause of the access impairment. This will relieve some of the future load on the access-impaired storage array.

After identifying the storage array to receive the data from the original storage array, program 90 writes a predetermined amount of the data from the access-constrained storage array to a lesser access-constrained storage array (step 120). By way of example, program 90 writes a predetermined number of logical units (such as 10-20%) of the storage capacity of the access-constrained storage array to a lesser access-constrained storage array. Typically, this will relieve the over-constraint of the previously constrained storage array. Next, program 90 waits the next predetermined interval (step 130), and then loops back to step 100 to repeat the foregoing process for the next time interval.

The following describes in more detail the foregoing steps 110-118 performed by program 90 to determine the overall access constraint of each storage array and determine corrective action when the overall access constraint level is above a predetermined upper limit.

Configuration Data Collected by Program 90 for its Storage Server and Array:
  Model number.
  Size of NVS: The amount of nonvolatile storage in megabytes allocated to each cluster.
  Size of cache memory: The amount of cache (semiconductor) memory 67a in megabytes allocated to each storage cluster.
  Disk RPM: The Rotations Per Minute of the disk drive for a storage array (Disk Group, Array name)
  Array Name: The logical internal name assigned to the Array or Disk Group.
  Interval: The number of seconds between each data collection of the utilization/performance metrics. By way of example, the interval is 900 seconds, i.e. fifteen minutes. In the illustrated embodiment, all of the performance metrics gathered during this time period are averages over the 15 minute interval.

Performance Data Collected by Program 90 for its Storage Array Is Described Above.

Configurable Thresholds to Be Set by a User:

| | |
|---|---|
| $array nameavgnvslt; for PCT IOs held waiting due to lack of NVS | // Low end of the threshold range |
| $array nameavgnvsht ; for PCT IOs held waiting due to lack of NVS | // High end of the threshold range |
| $array nameavgnvspth; PCT IOs held waiting due to lack of NVS | // High threshold points assigned for |
| $array nameavgnvsptl; IOs held waiting due to lack of NVS | // Low threshold points assigned for PCT |
| $array nameavgcachetlt; IOs are held in cache | // Low threshold for the amount of seconds |
| $array nameavgcachetht; IOs are held in cache | // High threshold for the amount of seconds |
| $array nameavgcachetpth; for the amount of seconds IOs are held in cache | // Points assigned if less than low threshold |
| $array nameavgcachetptl; for the amount of seconds IOs are held in cache | // Points assigned if less then high threshold |
| $array nameavgiowht; | // High threshold for average weighted IOs |
| $array nameavgiowpth; threshold for average IOs | // Points assigned if greater than |
| $array nameiormaxwlt; I/O rate | // Low end threshold for the weighted max |
| $array nameiormaxwht; rate | // High end of the for the weighted max I/O |
| $array nameiormaxwptl; range for the weighted max I/O rate | //Points assigned if in between low and high |
| $array nameiormaxwpth; for the weighted max I/O rate | // Points assigned if greater than high range |
| $array nameavgutillt; | // Avg Disk utilization low threshold $array |
| nameavgutilht; | // Avg Disk utilization high threshold |
| $array nameavgutilptl; greater than low threshold | // Points assigned if Avg Disk utilization is |
| $array nameavgutilpth; greater than high threshold | // Points assigned if Avg Disk utilization is |
| $array nameutilmaxht; | // Threshold for disk utilization max |
| $array nameutilmaxpth; greater than threshold | // Points assigned if disk utilization max is |
| $array namewt80015k; 800 and 15k rpm drives | // PCT used for weighting factor if model |
| $array namewt80010k; 800 and 10k rpm drives | //PCT used for weighting factor if model |

After obtaining utilization data for the different utilization metrics, and obtaining the configuration data, program 90 processes the data to determine an overall level of storage access-impairment by each storage controller to its storage devices:

ARRAY NAME Class:
Program 90 can be implemented as a function in a class definition for an object named ARRAY NAME. The ARRAY NAME object refers to the logical internal storage array name.

Constructor:
In this embodiment and example of program 90, the ARRAY NAME object's thresholds as defined above are set in the objects constructor as follows:

```
function ARRAY NAME ( ) {
    $this->array nameavgnvslt= 3;
    $this->array nameavgnvsht = 10;
    $this->array nameavgnvspth= 25;
    $this->array nameavgnvsptl= 8;
    $this->array nameavgcachetlt= 100;
    $this->array nameavgcachetht= 250;
    $this->array nameavgcachetpth= 10;
    $this->array nameavgcachetptl= 5;
    $this->array nameavgiowht=200;
    $this->array nameavgiowpth=15;
    $this->array nameiormaxwlt=300;
    $this->array nameiormaxwht=400;
    $this->array nameiormaxwptl=3;
    $this->array nameiormaxwpth=5;
    $this->array nameavgutillt=50;
    $this->array nameavgutilht=80;
    $this->array nameavgutilptl=8;
    $this->array nameavgutilpth=8;
    $this->array nameutilmaxht=90;
    $this->array nameutilmaxpth=2;
    $this->array namewt80015k= .7;
    $this->array namewt80010k=.85;
}
```

ARRAY NAME Scoring Function: In this embodiment and example of program 90, the algorithm of program 90 is as follows:

```
//========================
//1) Normalize the I/Os
//========================
function calcscore($model,$rpm,$avgior,$maxior,$avgnvs,$avgcachet,
$avgutil,$maxutil) {
    // Weight the I/Os
    if (preg_match("/800/",$model))
    {
        if ($rpm < 15000)
        {            // Model is 800 and disk rpms are 10k
            if ($avgior > 0)
            {
                $avgiowt = $avgior * $this->arraywt80010k ;
                $maxiorw = $maxior * $this->arraywt80010k ;
            }
        } else {
            if ($avgior > 0)
            {
                $avgiowt = $avgior * $this->arraywt80015k;
                $maxiorw = $maxior * $this->arraywt80015k;
            }
        }
    }
    Else
    {                                          // Model is F20
        $avgiowt = $avgior;
        $maxiorw = $maxior;
    }
//=======================================================
// 2) Apply the Threshold Calculations II
// 3) Summarize the Score
//=======================================================
    // Calculate Arrayings based on weighted avg - these are additive
    if ($avgnvs >= $this->arrayavgnvsht )
    {
        $arrayscore = $arrayscore + $this->arrayavgnvspth;
    }
    if ($avgnvs >= $this->arrayavgnvslt && $avgnvs <=
$this->arrayavgvnsht)
    {
        $arrayscore = $arrayscore + $this->arrayavgnvsptl;
```

-continued

```
    }
    if ($avgcachet <= $this->arrayavgcachetlt)
    {
        $arrayscore = $arrayscore + $this->arrayavgcachetpth;
    }
    if ($avgcachet >= $this->arrayavgcachetlt && $avgcachet <=
$this->arrayavgcacheth)
    {
        $arrayscore = $arrayscore + $this->arrayavgcachetptl;
    }
    if ($avgiowt >= $this->arrayavgiowht)
    {
        $arrayscore = $arrayscore + $this->arrayavgiowpth;
    }
    if ($maxiorw >= $this->arrayiormaxwlt && $maxiorw <
$this->arrayiormaxwht)
    {
        $arrayscore = $arrayscore + $this->arrayiormaxwptl;
    }
    if ($maxiorw >= $this->arrayiormaxwht )
    {
        $arrayscore = $arrayscore + $this->arrayiormaxwpth;
    }
    if ($avgutil >= $this->arrayavgutillt)
    {
        $arrayscore = $arrayscore+ $this->arrayavgutilptl;
    }
    if ($avgutil >= $this->arrayavgutilht)
    {
        $arrayscore = $arrayscore + $this->arrayavgutilpth;
    }
    if ($maxutil >= $this->arrayutilmaxht)
    {
        $arrayscore = $arrayscore + $this->arrayutilmaxpth;
    }
    return $arrayscore;
}
4) Create the Report
```

Program 90 can generate an Array Scoring Report as follows:

Array Scoring Report

The Array Score HTML Reports may consist of a sorted list of array names based on key performance metrics. The detailed array name data can be collected at a user configurable interval and analyzed and reported on a user configured interval. For example, this could be performed on a nightly basis at fifteen minute intervals and summarized into a report for either (the storage devices of) each storage server or a user defined logical grouping of (the storage devices of) the storage servers. Each row in the report contains fields that describe configuration information or performance metrics. The performance metrics are averages based on the user defined shift. For example, the following time periods might be useful for analysis:

00:00-23:59—This is an average of the metrics over the entire 24 hour period for the date selected.

07:00-15:00—This is an average of the metrics over the prime shift. Times are local to the ESS.

Optional Array name Score Report Color Code: The Report can be color coded based on a number of key performance metrics, as follows:

RED-Performance of one array is severely constrained.

ORANGE-Performance of one array is (moderately) constrained.

YELLOW-Performance of one array is nearly constrained; this is a "watch list" of storage controllers.

GRAY-The array has adequate bandwidth.

GREEN-No performance constraints of the array are observed.

The Report may comprise a table with the following column headings, and corresponding data entries in each column.

Storage Controller Serial and Model Number
Size of Cache Memory per Cluster
Number of Storage Tracks per Cluster
RPM of Disks
Total Size of cache storage per Cluster
Cluster Identifier
Adapter identification number
Serial Storage Architecture Loop- Disk Group identification number
Array name
Average DISK I/O Rate
Maximum DISK I/O Rate For any storage arrays whose access is severely impaired/constrained, program 90 identifies a number of logical units of data from the storage device of the severely impaired storage controller to move to a storage disk of an unimpaired or lesser impaired storage array, as explained above. By way of example, program 90 moves twenty logical units of data from the storage device of the severely impaired/constrained storage controller to the storage device of the unimpaired or less impaired storage controller. By way of example, this number of logical units represents five percent of the storage capacity of the storage device.

Program 90 can be loaded into server 91 from a computer readable media 70 such as magnetic tape or disk, optical disk, DVD, semiconductor memory, etc. or downloaded from Internet 72 via TCP/IP adapter card 53.

Based on the foregoing, system, method and program product for managing storage controllers and storage devices have been disclosed. However, numerous modifications and substitutions can be made without deviating from the scope of the present invention. Therefore, the present invention has been disclosed by way of illustration and not limitation, and reference should be made to the following claims to determine the scope of the present invention.

What is claimed is:

1. A method for managing a storage server comprising a first cluster of first and second storage controllers controlling first and second storage arrays, and a second cluster of third and fourth storage controllers controlling third and fourth storage arrays, said first cluster including a first cache memory and a first nonvolatile storage ("NVS") shared by said first and second storage controllers, said second cluster including a second cache memory and a second nonvolatile storage ("NVS") shared by said third and fourth storage controllers, said method comprising the steps of:

determining a level of impairment of access to said first and second storage arrays based on an amount of time that data controlled by said first cluster was held in said first cache memory before being outpaged to said first and second storage arrays, and an amount of requests to access said first and second storage arrays that were delayed due to insufficient first NVS;

determining a level of impairment of access to said third and fourth storage arrays based on an amount of time that data controlled by said second cluster was held in said second cache memory before being outpaged to said third and fourth storage arrays, and an amount of requests to access said third and fourth storage arrays that were delayed due to insufficient second NVS; and moving data out of one of said storage arrays based on either or both of the determining steps.

2. A method as set forth in claim 1 wherein the step of determining a level of impairment of access to said first and second storage arrays determines that there were an excessive amount of requests to access said first storage array that were delayed due to insufficient first NVS, and in response, determining that data from said first storage array should be moved to another storage array that has a lower level of impairment; and moving said data from said first storage array to said any other storage array.

3. A method as set forth in claim 1 wherein the step of determining a level of impairment of access to said first and second storage arrays determines that the amount of time that data controlled by said first cluster was held in said first cache memory being outpaged to said first or second storage arrays was too short, and in response, determining that some of said data in said first storage array should be moved to another storage array controlled by another cluster, said other storage array having a lower or lowest level of impairment; and moving said data in said first storage array to said other storage array.

4. A method as set forth in claim 1 further comprising the steps of:

determining a level of impairment of access to said first storage array based on an amount of time required to satisfy substantially all subsystem I/O requests to said first storage array, and an amount of subsystem I/O requests to said first storage array.

5. A method as set forth in claim 4 further comprising the steps of:

determining an excessive level of impairment of access to said first storage array based on an excessive amount of time required to satisfy substantially all subsystem I/O requests to said first storage array, and/or an excessive amount of subsystem I/O requests to said first storage array, and in response, determining that data from said first storage away should be moved to another storage array with a lower level of access impairment; and moving said data from said first storage array to said other storage array.

6. A method as set forth in claim 1 wherein the step of determining a level of impairment of access to said first and second storage arrays determines that there is an excessive amount of time required for said first cluster to access said first storage array, and in response, determining that data from said first storage array should be moved to another storage array with a lower level of access impairment; and moving said data from said first storage array to said other storage array.

7. A computer program product for managing a storage server comprising a first cluster of first and second storage controllers controlling first and second storage arrays, and a second cluster of third and fourth storage controllers controlling third and fourth storage arrays, said first cluster including a first cache memory and a first nonvolatile storage ("NVS") shared by said first and second storage controllers, said second cluster including a second cache memory and a second nonvolatile storage ("NVS") shared by said third and fourth storage controllers, said computer program product comprising:

a computer readable storage medium;

first program instructions to determine a level of impairment of access to said first and second storage arrays based on an amount of time that data controlled by said first cluster was held in said first cache memory before being outpaged to said first and second storage arrays, and an amount of requests to access said first and second storage arrays that were delayed due to insufficient first NVS;

second program instructions to determine a level of impairment of access to said third and fourth storage arrays based on an amount of time that data controlled by said second cluster was held in said second cache memory before being outpaged to said third and fourth storage arrays, and an amount of requests to access said third and fourth storage arrays that were delayed due to insufficient second NVS; and third program instructions to initiate movement of data out of one of said storage arrays based on either or both of the determining steps; and wherein said first, second and third program instructions are stored on said computer readable storage medium.

8. A computer program product as set forth in claim 7 wherein said first program instructions determine that there were an excessive amount of requests to access said first storage array that were delayed due to insufficient first NVS, and in response, determine that data from said first storage array should be moved to another storage array that has a lower level of impairment, and initiate movement of said data from said first storage array to said any other storage array.

9. A computer program product as set forth in claim 7 wherein said first program instructions determine that the amount of time that data controlled by said first cluster was held in said first cache memory being outpaged to said first or second storage arrays was too short, and in response, determine that some of said data in said first storage array should be moved to another storage array controlled by another cluster, said other storage array having a lower or lowest level of impairment, and initiate movement of said data in said first storage array to said other storage array.

10. A computer program product as set forth in claim 7 further comprising:

third program instructions to determine a level of impairment of access to said first storage array based on an amount of time required to satisfy substantially all subsystem I/O requests to said first storage array, and an amount of subsystem I/O requests to said first storage array; and wherein said third program instructions are stored on said computer readable storage medium.

11. A computer program product as set forth in claim 10 further comprising:

fourth program instructions to determine an excessive level of impairment of access to said first storage array based on an excessive amount of time required to satisfy substantially all subsystem I/O requests to said first storage array, and/or an excessive amount of subsystem I/O requests to said first storage array, and in response, determine that data from said first storage away should be moved to another storage away with a lower level of access impairment, and initiate movement of said data from said first storage array to said other storage array; and wherein said fourth program instructions are stored on said computer readable storage medium.

12. A computer program product as set forth in claim 7 wherein said first program instructions determine that there is an excessive amount of time required for said first cluster to access said first storage array, and in response, determine that data from said first storage away should be moved to another storage array with a lower level of access impairment, and initiate movement of said data from said first storage away to said other storage array.

13. A computer system product for managing a storage server comprising a first cluster of first and second storage controllers controlling first and second storage arrays, and a second cluster of third and fourth storage controllers controlling third and fourth storage arrays, said first cluster including a first cache memory and a first nonvolatile storage ("NVS") shared by said first and second storage controllers, said second cluster including a second cache memory and a second nonvolatile storage ("NVS") shared by said third and fourth storage controllers, said computer system comprising:

a CPU;

first program instructions to determine a level of impairment of access to said first and second storage arrays based on an amount of time that data controlled by said first cluster was held in said first cache memory before being outpaged to said first and second storage arrays, and an amount of requests to access said first and second storage arrays that were delayed due to insufficient first NVS;

second program instructions to determine a level of impairment of access to said third and fourth storage arrays based on an amount of time that data controlled by said second cluster was held in said second cache memory before being outpaged to said third and fourth storage arrays, and an amount of requests to access said third and fourth storage arrays that were delayed due to insufficient second NVS; and third program instructions to initiate movement of data out of one of said storage arrays based on either or both of the determining steps; and wherein said first, second and third program instructions are stored in said computer system for execution by said CPU.

14. A computer system as set forth in claim 13 wherein said first program instructions determine that there were an excessive amount of requests to access said first storage array that were delayed due to insufficient first NVS, and in response, determine that data from said first storage away should be moved to another storage away that has a lower level of impairment, and initiate movement of said data from said first storage array to said any other storage array.

15. A computer system as set forth in claim 13 wherein said first program instructions determine that the amount of time that data controlled by said first cluster was held in said first cache memory being outpaged to said first or second storage arrays was too short, and in response, determine that some of said data in said first storage array should be moved to another storage array controlled by another cluster, said other storage array having a lower or lowest level of impairment, and initiate movement of said data in said first storage array to said other storage array.

16. A computer system as set forth in claim 13 further comprising:

third program instructions to determine a level of impairment of access to said first storage away based on an amount of time required to satisfy substantially all subsystem I/O requests to said first storage array, and an amount of subsystem I/O requests to said first storage array; and wherein said third program instructions are stored in said computer system for execution by said CPU.

17. A computer system as set forth in claim 16 further comprising:

fourth program instructions to determine an excessive level of impairment of access to said first storage array based on an excessive amount of time required to satisfy substantially all subsystem I/O requests to said first storage array, and/or an excessive amount of subsystem I/O requests to said first storage array, and in response, determine that data from said first storage away should be moved to another storage away with a lower level of access impairment, and initiate movement of said data from said first storage array to said other storage array; and wherein said fourth program instructions are stored in said computer system for execution by said CPU.

18. A computer system as set forth in claim 13 wherein said first program instructions determine that there is an excessive amount of time required for said first cluster to access said first storage array, and in response, determine that data from said first storage away should be moved to another storage array with a lower level of access impairment, and initiate movement of said data from said first storage array to said other storage array.

* * * * *